UNITED STATES PATENT OFFICE.

CYRUS FIELD WILLARD, OF SAN DIEGO, CALIFORNIA.

PROCESS FOR DEVULCANIZING VULCANIZED RUBBER.

1,322,152.            Specification of Letters Patent.      Patented Nov. 18, 1919.

No Drawing.      Application filed December 5, 1918. Serial No. 265,342.

*To all whom it may concern:*

Be it known that I, CYRUS FIELD WILLARD, a citizen of the United States, residing at San Diego, county of San Diego, and State of California, have invented a new and useful Process for Devulcanizing Vulcanized Rubber, which invention is set forth in the following specification.

The present invention relates to a process for devulcanizing vulcanized rubber by extracting sulfur that was combined with the rubber in the process of vulcanization by using an emulsoid colloid solution of a viscid and gummy nature which has a strong affinity for sulfur and which under proper conditions of heat and moisture will liberate combined sulfur so that it, the free sulfur and the liberating agent can be removed from the rubber by some strong detergent or cleansing solution, all in one operation, and the rubber so treated restored to a condition approximating its original condition before being vulcanized, and which process can be used to devulcanize vulcanized rubber intimately associated with fabric or fiber, (as in ground auto tires, rubber boots and shoes, hose, etc.,) in the presence of the fiber without destroying this fiber, as has heretofore been considered necessary, and reclaiming the fiber as well as devulcanizing the rubber, and saving the two separately or combined, as well as the product resulting from the use of such a process.

This process is in sharp contradistinction to the usual processes now in use for regenerating or reclaiming vulcanized rubber which simply produce the restoration of plasticity to the rubber with generally a higher content of combined sulfur after the process than it had before.

In working out this process over a term of years both in the laboratory and in the large reclaiming plants on a commercial scale, I have made three important discoveries of far-reaching importance, which are:—

1. Combined sulfur can be removed cheaply and on a commercial scale from vulcanized rubber, contrary to the opinion heretofore held by many rubber chemists, and the rubber restored to a condition approximating the condition it was in before vulcanization.

2. Vulcanized rubber, as an emulsoid colloid gel, under the proper conditions of heat and moisture, will, in the presence of another suitable emulsoid colloid of the proper degree of viscosity, yield up its combined sulfur, (to a great extent) to the new colloid which furnishes a medium in which a new adsorptive action can take place especially when a sulfur solvent in combination with the new colloid is used, and the liberated combined sulfur and other sulfur unites with the molecules or rather with the disperse phase of the new colloid which is then in a condition where it can be removed from the rubber by a strong detergent solution carrying the sulfur with it as well as other elements compounded with the rubber.

3. Among the emulsoid colloids or those which may be made to assume the form of emulsoid colloid solutions and which may be roughly classified as hydrocarbons or oxidized hydrocarbons capable of liquefaction, I have discovered that tar, (wood or coal,) pitch, rosin, gums, resins or balsams can be employed to form such an emulsoid colloid solution. Among these tar, (wood or coal,) is one of the best adapted for the purpose inasmuch as it has a strong affinity for sulfur and under proper conditions and in combination with a suitable sulfur solvent used as what I term a "flux," as a part of the emulsoid colloid solution, will take to itself the sulfur which has heretofore been combined with the rubber particle and being more or less saponifiable can be removed from the rubber, bearing its load of adsorbed sulfur when boiled the proper length of time, either in the open or under steam pressure, in a strong detergent solution.

Along these lines I have already made applications for Letters Patent, Serial No. 171,923, filed May 31, 1917, for a process for devulcanizing vulcanized rubber where only rubber is treated and also application, Serial No. 223,208, filed March 18, 1918 for devulcanizing process and product therefrom, in which the rubber is devulcanized in the presence of the fiber usually associated with the rubber in rubber scrap and making products resembling leather and other products therefrom. But in both of these applications the process as originally described set forth specifically only a two step or two stage process where the rubber was first boiled with the emulsoid colloid solution and afterward the rubber was boiled with a detergent or cleansing solution in order to remove from the rubber the emulsoid colloid solution so used, although nothing was set forth which would prevent the two operations being combined in one.

I have found it necessary in this application to go into the whole matter of vulcanization and devulcanization more fully and at greater length than in the previous applications in order that the operations can be better understood in their far-reaching importance to the art by rubber chemists and others skilled in the art.

It is therefore necessary to describe these operations in the terms of colloidal chemistry under which rubber is now conceded to be an emulsoid colloid. In the latex, the rubber particle is covered with a protective colloid of protein or nitrogenous matter, which is removed by various methods, such as the use of acetic acid, smoking, etc. When this is done, the disperse phase is lowered and the semiliquid rubber particles coagulate or more correctly coalesce, and the hydrosol becomes a gel, as what is termed "crude rubber." After this is washed, (when necessary) and massed together, it is mixed with sulfur as a vulcanizing agent as well as other compounds, and by what is now recognized in more modern practice as a process of adsorption, the sulfur in proportion to the co-efficient of vulcanization unites with the rubber particle under the desired degree of heat and with or without pressure.

Sulfur melts at 114° C. (239° F.) and becomes on raising this temperature, a thick viscid liquid of colloidal nature which under certain conditions can be made to present a curious parallel to rubber in elasticity and plasticity. It was generally supposed until recently that 247° F. was the lowest temperature at which rubber could be vulcanized but rubber has been vulcanized with sulfur as low as 212° F. and at the same temperature I have also devulcanized it by my process.

As the melted sulfur is adsorbed and combined with the rubber particle as a protective colloid, similar to the nitrogenous protective colloid in the latex, when the disperse phase is heightened by heat, and as. the vulcanized rubber becomes after cooling a gel to the sol of crude rubber as the latter was a gel to the sol of the latex, it is evident to those acquainted with adsorption processes that the cooling of the vulcanized rubber lowered the disperse phase and made it extremely difficult to remove the protective colloid of combined sulfur now closely incorporated in the disperse phase of the gel particularly if the sulfur had assumed in part the insoluble form or the colloidal form, mentioned above where it is incorporated in close admixture with the similar colloidal rubber gel. The problem then of removing the combined sulfur of vulcanization and thus bring about devulcanization is how best to reverse such adsorption, since all other adsorption processes are now recognized as being reversible, and remove the protective colloid of sulfur in the rubber from the rubber particle as the protective colloid of nitrogenous matter was removed from the rubber particle in the latex.

It has been the custom among some of the rubber chemists to regard the combined sulfur as impossible to remove commercially owing to the fact that it had not been done. Commercial attempts in the direction of utilizing waste vulcanized rubber have been mainly directed to removing the free sulfur, destroying the fiber, if any, by acid or alkali, and restoring the rubber to a state of plasticity, (sometimes termed "depolymerization") where it could be mixed in and massed with new rubber and used over again.

While it is possible to remove the combined sulfur to a great extent by the use of emulsoid colloid solutions of tar, rosin, pitch, resins, gums and balsams and hence these are covered by this application as a part of my process, I have found by practice that wood or coal tar, and particularly wood tar, does take up the combined sulfur as well as the free to a greater extent than other emulsoid colloids so that analysis of the devulcanized rubber by others than applicant showed a removal of over 50% of the combined sulfur and in one case only 0.58% remained.

But I do not limit myself to the use of an emulsoid colloid solution of tar alone as it is possible to use in my process any of the above-named rosin, pitch, resins, gums or balsams which can be liquefied to make an emulsoid colloid solution and hence such are covered in this application. The removal of over 50% of the combined sulfur as shown by analysis shows that there is no scientific reason why practically 100% cannot be removed except perhaps only the small amount which obstinately remains in gel colloids such as silicic acid, which sulfur would remain in the rubber gel and which it would not pay to attempt to extract.

While I use turpentine by preference as a solvent or flux with the emulsoid colloid solution, I do not limit myself to turpentine alone but can use other solvents, such as kerosene, carbon disulfid, alcohol, benzin or any of the other known solvents as a solvent or flux with the tar, rosin, pitch, resins, gums or balsams used to form the emulsoid colloid solution. This emulsoid colloid solution with the solvent or flux acts in the presence of a 3% caustic soda solution used as a detergent or cleansing agent and thus all operations can be condensed into a one-step process.

My process is operated as follows: On rubber scrap that contains no fabric, it is possible to remove combined sulfur by treating the rubber in pieces as large as 8 or 9 sq. inches, in size, or it can be ground fine and then treated which is more effective, quicker and cheaper. If it contains fabric as is generally the case with old auto tires, rubber boots and shoes rubber hose and other rubber scrap, it is better, quicker and cheaper to grind it fine, say from ¼ to ¾ mesh and treat the rubber and fiber together and devulcanize the rubber in the presence of the fiber while reclaiming the fiber at the same time and thus obtaining a product at one and the same time which has ordinarily to be produced by the artificial mixing together of rubber and fiber, as in the case of rubber soles. This does not prevent using the older methods if desired of destroying the fiber by acid or alkali or separating it by mechanical means either before or after devulcanization of the rubber.

The ground-up vulcanized rubber is boiled up with water, either in the open or under steam pressure, and an emulsoid colloid solution of a viscid, gummy nature, such as tar, rosin, pitch, gum, resin and balsam, but by preference, tar, in order to heighten the disperse phase of the rubber colloid while the hot water, steam and tar enters the honeycomb structure of the rubber gel and acts as a continuous phase or medium, "swelling" the rubber. This allows the rubber molecule or particle coated with the protective colloid of the sulfur of vulcanization to come in contact with the fresh, unsaturated emulsoid colloid of tar which takes to itself the sulfur loosened up from the rubber particle by the sulfur solvents disengaged by the boiling hydrocarbon and steam in contact with the hot iron vessel or those solvents which may be introduced with the emulsoid colloid and used to heighten the effect of the disengaged solvents and which introduced solvent may be carbon disulfid, turpentine, benzin, kerosene, alcohol, naphthalene or any of the known sulfur solvents either separately or combined. The sulfur so liberated goes from the rubber colloid particle to the fresh and unsaturated particles of the tar colloid to be adsorbed by the latter particularly as the tar colloid particles have a strong affinity for sulfur as compared with the saturated rubber particles, where sulfur is always used in excess, leaving the unattached sulfur known as "free sulfur" during the process of vulcanization.

In my former applications, the tar colloidal solution after it had taken the sulfur liberated from the rubber to itself, was then discharged from the vessel and a detergent or cleansing solution, by preference a 3% solution of caustic soda, (sodium hydroxid), is then used which partially saponifies and removes the remaining emulsoid colloid, sulfur and other remaining compounds.

In this process, the detergent or cleansing solution of whatever alkali may be used, is introduced into the usual steam-jacketed kettles used in reclaiming works, after the rubber and emulsoid colloid solution have been put into the kettle and been brought into intimate association, and the whole mixture is then boiled together for 20 hours or more if boiled in the open. If the mixture is boiled in a closed kettle, under steam pressure which may vary in accordance with the other variables, but which under practice has been determined that about 50 pounds steam pressure represents the average maximum necessary, the devulcanizing effect will be produced in 10 hours or less, which materially shortens the time of operation, increasing the capacity of the factory and making the operation a one-step process, thus obviating the necessity of rehandling which is desired by all reclaiming works as decreasing the cost of production.

This produces a product which seems to be practically as good as where the two operations are separate, showing that the emulsoid colloid solution acts on the sulfur of vulcanization while in the presence of a saponifying agent like the caustic soda solution, and this emulsoid colloiod is removed from the rubber while the disperse phase of the latter is in a heightened condition with the dissolved and liberated sulfur and solute.

The rubber is left in a similar state to what it was before vulcanization and it can be washed, dried, massed and sheeted over the rolls usually employed in rubber factories in the same maner as crude rubber and thus is produced a high grade of devulcanized rubbed in contradistinction to what is known as "reclaimed rubber" which is not devulcanized but has a greater percentage of combined sulfur after than it had before treatment.

When the emulsoid colloid is to be used for boiling in open vessels, I generally use wood tar in the proportion of one part of tar to one part of rubber scrap, that is 100 pounds of tar to 100 pounds of rubber scrap, but as there are so many variables in the varying compounds in the mix before vulcanization and in the quality of the rubber, time of vulcanization and percentage of sulfur used, it is possible to diminish or increase these proportions within certain bounds, usually never less than 40 parts of tar to 100 parts of rubber scrap. This tar is mixed with water in the proportion of one pound of tar to a gallon of water although it may be advisable to diminish the water to the proportion of one pound of tar to one quart of water and these are variables that can be modified within certain limits to fit the circumstances. The resultant emulsoid colloid solution after heating together is raised by heat to the boiling point of water, 100° C. taking care to preserve the same disperse phase as far as possible in its relation to the disperse phase of the rubber colloid under the action of the heat and the "swelling" action of the hot water, steam and volatile sulfur solvents, either those introduced or disengaged from the boiling hydrocarbons and steam in the hot iron kettle. It is important that the emulsoid colloid solution shall, if boiled in open vessels, bear the same relation in mass and viscosity toward the end of the operation as it did in the beginning so that there will always be enough fresh molecules or particles of the emulsoid colloid solution to adsorb the sulfur liberated from the rubber molecules as it is well known to chemists that the unsaturated molecules are much more active than the saturated molecules. But this is unnecessary to observe when the mixture is boiled in tightly closed steam jacketed kettles under steam pressure where there is, in consequence, no loss from evaporation of any of the volatile elements employed.

I have found that when the rubber is "swelled" by a preliminary boiling in ethyl or methyl alcohol, a better effect is produced due to the taking up in solution of more or less of the free sulfur and, probably, action of the alcohol on the protective colloid of combined sulfur on the rubber particle as the alcohol when removed from the rubber shows a high percentage of sulfur content. When the water used with the tar is raised to steam in the presence of vulcanized rubber in steam jacketed iron vessels the hydrogen of the steam or of the hydrocarbon may unite with the sulfur of vulcanization to form $H_2S$ and there may also be in the complicated chemical reactions that take place in the presence of the heated sulfur and the oxidized hydrocarbons of the emulsoid colloid solution, a formation of $CS_2$ (carbon disulfid) and other very effective sulfur solvents.

This rubber before treatment may be intimately associated with fabric or fiber such as is the case with ground-up auto tires, boots and shoes, rubber hose and similar rubber scrap. This rubber can be and is devulcanized by my process in the presence of the fiber, without destroying the fiber, only modifying it to some extent by varying the percentage strength of the caustic soda solution employed in this one-step process herein described. This is another point wherein my process varies from the process usually employed where it is necessary to destroy the fiber in the alkali solution employed in order that the rubber remaining shall have the desired plasticity. This process of mine not only devulcanizes the rubber but it reclaims the fiber. This can either be milled up with the devulcanized rubber to form a product which can be vulcanized again by the addition of the necessary sulfur and other compounds into forms resembling leather, linoleum, mats of all kinds, solid truck tires, soles and heels, and other forms of mechanical goods, hard rubber, etc., or sold in its raw state or the fiber can be separated from the devulcanized rubber by washing, by mechanical means or by any other means, and the two sold or used separately as separate products.

When the rubber has been cleaned from the tar, sulfur, etc., it may be necessary to wash it again in the same vessel, from which the devulcanizing mixture has been discharged, in plain hot water to get rid of impurities not necessary to specify, which can be done in the same vessel or on the regular washing rolls used in rubber factories. It is then dried slowly by natural heat or such other means as may seem best. Before final drying, it may be advisable to further deresinate the devulcanized product depending on the character of the rubber treated, whether Pará, plantation, African or Mexican, and this can be accomplished by further boiling for two or more hours in alcohol.

On the other hand, it may result that the resins of the rubber have been so far removed and the rubber so deresinated, that it will be necessary to add after devulcanization, from two or five per cent. of tar, resin, balsam or gum to the rubber, as others have done, in order to give the rubber when dried and vulcanized the required "fiber" or "nerve" which added tar, resin, balsam or gum remains in the rubber as a permanent constituent of it. I am aware that others have used tar, resins, balsams and gums, which are left in the rubber to increase the "fiber" or nerve of the rubber and hence do not claim this as any part of my invention, and in fact do hereby expressly disclaim any intention to claim this as a part of my invention or discovery.

But I am not aware that any one has ever used an emulsoid colloid solution with intent as a substitute medium in a devulcanizing process to adsorb the sulfur of vulcanization liberated from the rubber particle by prolonged boiling with an emulsoid colloid solution having an affinity for sulfur in combination with a surfur solvent or solvents, and removing the emulsoid colloid solution with the liberated surfur from the treated rubber with a detergent or cleansing solution to remove all traces of such colloid solution as far as may be possible, either as a one-step or two-step process, with or without fabric, under steam pressure in closed vessels or by boiling in open vessels without pressure.

I am not aware that any one before myself has devulcanized rubber scrap containing fabric or fiber, where the rubber is devulcanized in the presence of the fiber without destroying the fiber either by the one-step process herein described or in the two-step processes described in former applications. Nor where the resultant product of devulcanized rubber and reclaimed fiber so intimately associated can be milled together and sheeted to form a product which is the basis for the manufacture of many various compositions of matter resembling leather, linoleum, etc. and used in making soles, heels, mats, and other forms of mechanical rubber goods by adding sulfur and vulcanizing as heretofore described or separated as hereinbefore suggested.

In fact, I know from experience that in reclaiming works, such is not the custom, although tar and resins may be used, not removed and left in the rubber, for the reasons above stated but not used as I use them as a substitute medium in which the liberated sulfur can be adsorbed and removed.

Therefore what I claim as new and desire to secure by Letters Patent, is:

1. A process of devulcanizing vulcanized rubber which comprises effecting the liberation of more or less of the combined sulfur by boiling it with an emulsoid colloid solution and a detergent or cleansing solution.

2. A process of devulcanizing vulcanized rubber which comprises effecting the liberation of more or less of the combined sulfur by boiling it with an emulsoid colloid solution, a sulfur solvent and a detergent or cleansing solution.

3. A process of devulcanizing vulcanized rubber in which the rubber is boiled in a closed vessel under steam pressure with an emulsoid colloid solution composed of a liquefied hydrocarbon, a sulfur solvent and water and a detergent solution added thereto, all in the one operation.

4. A process of devulcanizing vulcanized rubber which comprises effecting the liberation of combined sulfur by the action of a suitable emulsoid colloid solution with heat and moisture a sulfur solvent and a detergent solution combined therewith, all in one operation.

5. A process of devulcanizing vulcanized rubber intimately associated with fabric or fiber in the presence of the fiber without destroying the fiber by boiling it under steam pressure with an emulsoid colloid solution and a detergent solution of such strength as not to destroy the fiber, all in one operation.

6. A process of devulcanizing vulcanized rubber intimately associated with fabric or fiber, in the presence of the fiber, without destroying the fiber by boiling it under steam pressure with an emulsoid colloid solution composed of a liquefied hydrocarbon heated up with water, and a sulfur solvent or solvents, used separately or in combination, and a detergent solution of caustic soda of such strength as not to destroy the fiber added to the vessel after the rubber and emulsoid colloid solution to complete the devulcanizing process all in one operation, as herein described and for the purpose set forth.

7. The product obtained by the process herein described of devulcanizing vulcanized rubber intimately associated with fabric or fiber, in the presence of the fiber, without destroying the fiber, by the use of an emulsoid colloid solution and a detergent all in one operation, whereby the fiber is reclaimed and the rubber is devulcanized at the same time.

CYRUS FIELD WILLARD.

Witnesses:
 Lou B. Mathews,
 John A. Lindeman.